United States Patent [19]

Maier et al.

[11] 4,312,177

[45] Jan. 26, 1982

[54] HEIGHT-CONTROL DEVICE FOR THE ELEVATABLE IMPLEMENT OF AN AGRICULTURAL HARVESTING MACHINE

[75] Inventors: Martin Maier; Josef Pürrer, both of Gottmadingen; Ronald Clemens, Allensbach, all of Fed. Rep. of Germany

[73] Assignee: Klöckner-Humboldt-Deutz AG Zweigniederlassung Fahr, Gottmadingen, Fed. Rep. of Germany

[21] Appl. No.: 148,235

[22] Filed: May 9, 1980

[30] Foreign Application Priority Data

May 11, 1979 [DE] Fed. Rep. of Germany ....... 2919123

[51] Int. Cl.³ .......................................... A01D 67/00
[52] U.S. Cl. .............................. 56/208; 56/DIG. 15; 56/DIG. 11; 56/10.2
[58] Field of Search .......... 56/208, DIG. 11, DIG. 9, 56/DIG. 15, 10.2, 11.9; 200/18, 153 T

[56] References Cited

U.S. PATENT DOCUMENTS 3,953,959  5/1976  Decruyenaere ........................ 56/208
4,193,250  3/1980  Kessens et al. ........................ 56/208
4,229,931 10/1980  Schlueter ............................... 56/208

Primary Examiner—Robert A. Hafer
Attorney, Agent, or Firm—Karl F. Ross

[57] ABSTRACT

A height adjuster for an agricultural implement, such as the crop pickup device of a field chopper, picker, thresher or like machine having an intake or pickup unit drawing the crop to a chopper or blower, has at least one movable front point or shoe which is swingable about an axis transverse to the direction of travel and rides on the ground. Within this shoe switches are provided to respond to the pivotal movements of the shoe and control a hydraulic cylinder for lifting or lowering the pickup unit to conform to changes in the ground contour.

9 Claims, 7 Drawing Figures

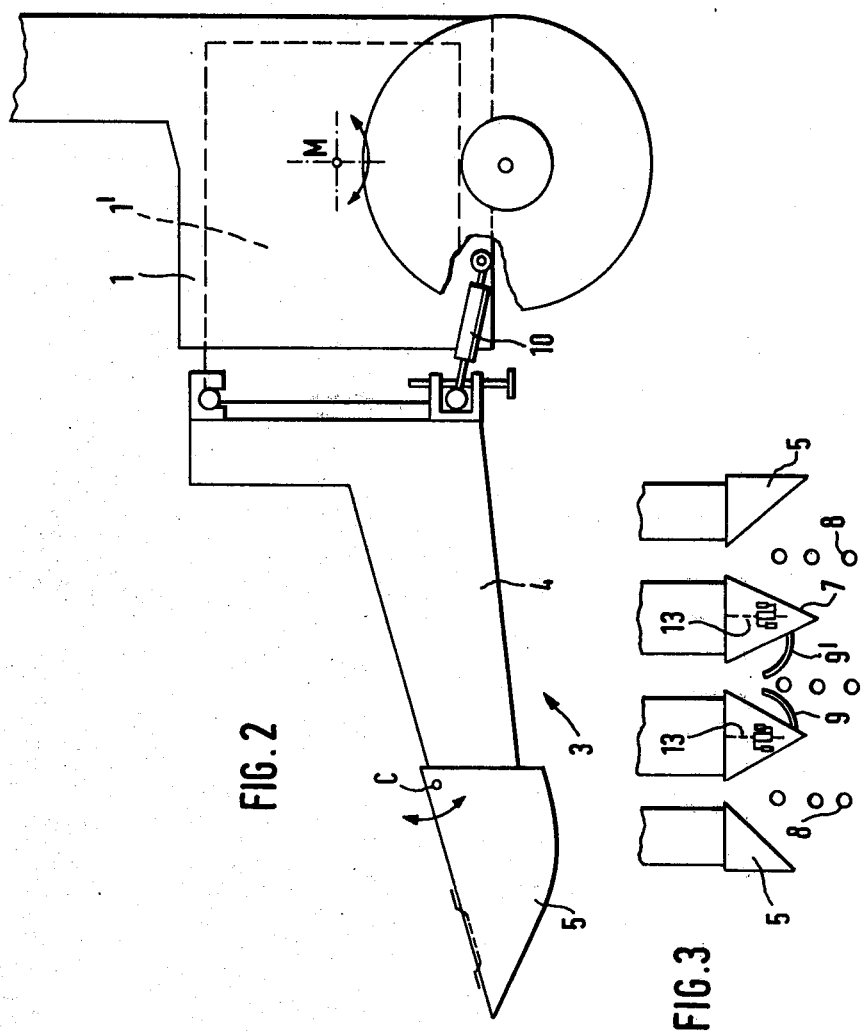

HEIGHT-CONTROL DEVICE FOR THE ELEVATABLE IMPLEMENT OF AN AGRICULTURAL HARVESTING MACHINE

CROSS REFERENCE TO RELATED APPLICATION

This application is related to our copending application Ser. No. 135,080 filed Mar. 28, 1980 and dealing with a guidance system for aligning a harvester with a row of crop.

Field of the Invention

Our present invention relates to crop harvesters and, more particularly, to a crop harvester having a pickup or intake unit ahead of the crop processing part of the machine and which must follow the ground contour. The invention relates especially to a height adjuster for such implements.

Background of the Invention

A height-control device can be provided for the elevatable implement of an agricultural harvesting machine which can be formed as a self-propelled machine, or a machine drawn by or mounted upon the three-point hitch of a tractor and whose implement is pivoted on the frame of the harvesting machine and comprises an intake unit and at least one front point pivotally mounted on a pivot axis transverse to the travel direction on the intake device, and at least one hydraulic cylinder connected on one side of the frame and on the other side to the implement at a distance from its pivot, the filling of the cylinder with fluid being controlled by a distributing valve commanded for "lifting" and "lowering" by electrical switches.

In the present description, reference will be made to a "pickup unit" or "intake unit" for agricultural machines of the aforedescribed type and it will be understood that such pickup units may depend upon the crop material being harvested and the processing to be carried out subsequently. For example, when the crop material is a stalk crop, such as corn, and the machine is a chopper for preparing silage, the pickup unit generally comprises one or more channels running toward a chopper drum and feeding the crop material by conveyor belts, chains or the like to the throat of the machine at which the stalks are generally fed endwise into the drum, chopped and blown into the forage wagon. At the leading edge of the pickup unit, a cutter blade is rotated or linearly reciprocated to sever the stalks close to the ground.

The pickup unit generally spans several rows and the crop material of each row usually passes between a pair of upwardly pointed shoes or "points" which separate the rows being harvested (separator points or shoes), or flank the outer rows being harvested (outer points or shoes).

In other implements, a previously cut crop may be picked up by the unit which generally has a wide mouth extending over the entire cut swath and is provided with a movable apron or belt, with or without a reel for pressing the crop onto the belt, conveying the crop material to the chopper drum or like crop-processing unit of the machine. In this case, only outer shoes flanking the swath may be provided.

A swath of standing crop may be collected in still other pickup units, similar to the one last mentioned, and additionally provided with a cutter blade or group of cutter blades at the lower leading edge of the crop pickup.

It will be apparent that for all of the pickup units or implements described, whether forming a simple pickup head or a picker head, the height of the implement above the ground should be constant for most purposes and hence that the implement should be raised and lowered to follow contours.

For this purpose height-control devices have been provided heretofore.

Height-control sensors of this type have been hitherto constructed so that, with their aid, the ground surface is mechanically detected. The mechanical deviation is transformed via switches, strain gauge strips or the like into a control command for the hydraulic cylinder whose filling establishes the level of the implement above the ground. All of these height sensors are relatively expensive in their configuration and are not reliable in rough field operations. Furthermore, the harvesting machine must be provided with such height-control devices at the factory. A later mounting is not possible.

OBJECTS OF THE INVENTION

The principal object of the invention is to provide a height-control device with a simple mechanical height sensor which does not itself come into contact with the ground surface.

Another object of this invention is to provide a height-control device for implements of the aforedescribed type which is free of the disadvantages of the earlier systems and, more specifically, is relatively simple, highly reliable, and is free from the tendency to become contaminated in use.

SUMMARY OF THE INVENTION

These objects and others which will become apparent hereinafter are attained, in accordance with a present invention, in an agricultural crop harvesting machine of the type in which a processing unit, e.g. a chopper and blower, is provided upon the machine frame which can be self-propelled, towed or mounted upon the three-point hitch of a tractor and provided with a prime mover such as an internal combustion engine or connected to the power take-off of a tractor, and a pickup unit which is pivotally mounted on the machine for swinging movement about an axis transverse to the direction of advance of the machine during harvesting operations.

According to the invention, the lower leading end of the pickup unit is raised or lowered by at least one hydraulic cylinder pivotally connected to the frame and to the pickup unit under the control of a height detector which is completely enclosed in a movable shoe or point pivotally connected to the pickup unit.

In other words, at least one of the outer or separating shoes or front points of the pickup unit is so mounted upon the latter as to be capable of swinging about a horizontal axis transverse to the direction of advance of the machine and this movement is utilized to control the hydraulic cylinder to raise and lower the pickup unit. According to the feature of this invention, a linearly extending height sensor is mounted in the movable shoe or point so that one end of this sensor passes through an opening in a rear wall of the hollow point and bears upon an abutment surface in the form of a plate swingable about the pivot axis of the point but adapted to be locked in place at any one of a plurality of selected positions. This sensor, which can be a rod, can carry a switch actuator which can cooperate with a pair of switches within the hollow point to control an electromagnetically responsive valve in the hydraulic circuit to the cylinder.

It is clear that here the pivotal movement of the front points serves for the height control. An additional and special height-control device is here formed as a simple mechanical part, such as a rod, a plate or the like, which is encased within the front point, but is accessible through a removable cover. It does not come into contact with the ground surface but can sense the movability associated with the ground surface during movement of the harvesting machine in the travel direction by the inclination of the front point relative to the intake unit upon which the front point is articulated in an elevatable manner. The ground surface is thus indirectly detected.

This embodiment provides a complete protection against dust and dirt for the height-control device so that it remains functionally reliable even in rough field operations.

A significant advantage also resides in the fact that even already manufactured agricultural harvesting machines can easily be equipped with such a height-control device. It is sufficient, for this purpose to replace the swingable front point without the height-control sensor with one provided with such a sensor and to mount the associated abutment surface on the intake unit.

The desired swinging play can be easily adjusted for any agricultural harvesting machine equipped with the height-control device by a corresponding positioning of the switches and actuated by the height-control sensors. The zero swinging point can be altered simply and with precision by swinging the abutment surface about is pivot.

The height-control device is highly satisfactory for field choppers, mowing threshers, loading wagons and the like. The front or separator points or shoes equipped with the height-control device, which are swingably connected with the intake unit should preferably be provided for at least one separator point. For a field chopper for corn, with upright stalks, the front points provided with the height-control device can be disposed somewhat lower than the fixed separator points. With cut cornstalks, the front points with the height-control device can lie at the same level as the fixed or nonpivotal separator points.

It will be self-understood that the height-control device should be so constructed that, when several pivotal front points are provided adjacent one another in the travel direction on the intake device, the control command "lift" should always have preference over the control command "lower". This is accomplished as described below more fully with double switches and by the method in which they are connected and increases the reliability of operation and improves the sensitivity of the height-control device to the ground surface.

The automatic height-control device is used in series with a manual switch which enables the operator to override the automatic height-control device, if required, by hand. This applies especially for the lifting of the implement. If the automatic switch for the automatic height-control device is taken out of operation, the manual switch also can be used to control the lowering of the implement by hand.

To facilitate guidance of the agricultural harvesting machine by the operator, the height-control device can be combined with a lateral guide device which can be introduced in a similar compact configuration together with the height-control device in the front point.

The result is a mechanically simple, serviceable and easily operated device which is especially effective for factory installation or after installation for numerous agricultural harvesting machines.

BRIEF DESCRIPTION OF THE DRAWING

The above and other objects, features and advantages of the invention will become more readily apparent from the following description, reference being made to the accompanying drawing in which:

FIG. 2 is a side-elevational view of the elevatable implement of the field chopper of FIG. 1;

FIG. 3 is a partial plan view similar to FIG. 1 of a three-row picking implement according to the invention;

SPECIFIC DESCRIPTION

Figure 1:
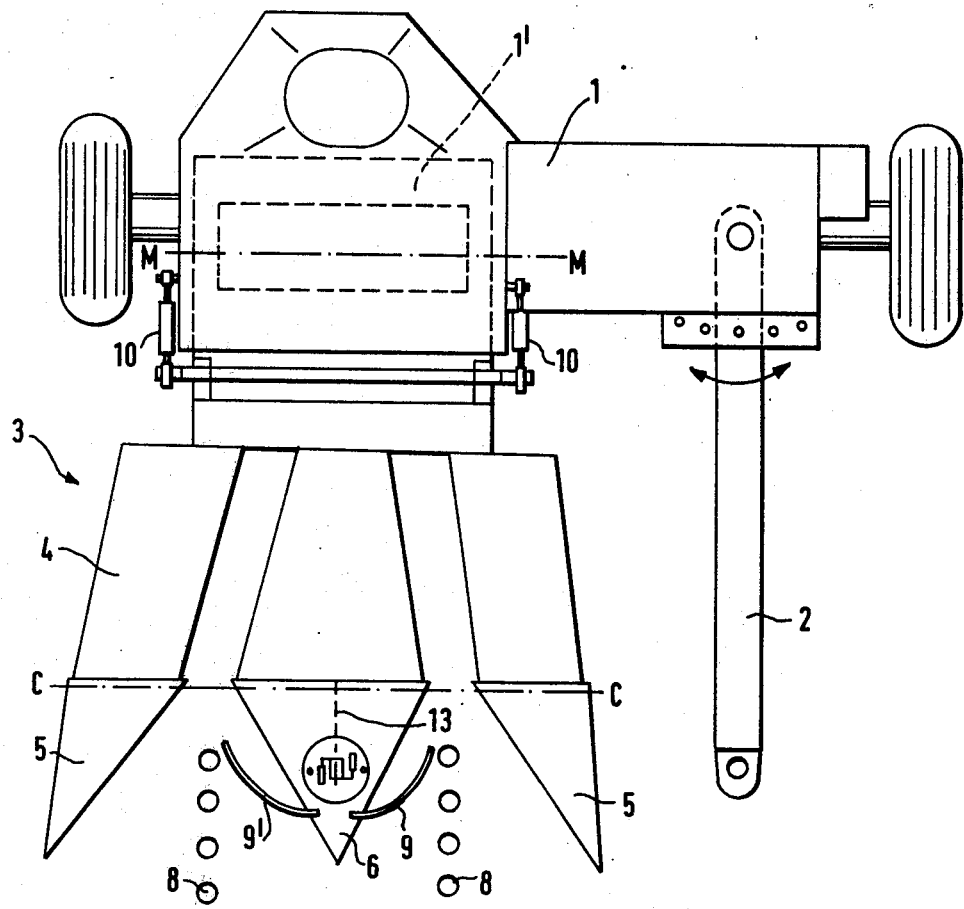
FIG. 1 is a schematic plan view of a field chopper embodying the invention.

FIG. 1 shows, as an example of an agricultural harvesting machine for the harvesting of a stalk crop, a field chopper with a corn head. It is a drawn harvesting machine. Upon its frame 1, a chopper housing 1' is provided. The frame 1 is further provided with a swingable towing pole 2 which serves to connect it to an agricultural tractor and can be locked in various angular positions by insert pins. Alongside the pivotal pole 2 extending from the frame 1 in the direction of travel lies the implement 3. In the embodiment of FIG. 1 this is a two-row picking attachment.

The implement 3 comprises an intake or pickup unit 4 shown only schematically, and front points or shoes 5, 6 and 7. For multirow operation, in which simultaneously an additional number of rows 8 of cornstalks are harvested, there are provided between the lateral front points 5, additional front points 6, 7 formed as separator points. These separator points carry lateral guide sensors 9 and 9' shown only schematically in FIGS. 1 and 3, which can serve as inputs into a lateral guide arrangement maintaining the field chopper in correct position along the rows 8 so that these rows will run correctly into the gaps of the intake unit 4.

The implement 3, of intake unit 4 and front points 5, 6, is elevatable, i.e. height movable, on the frame 1 about a pivot axis transverse to the direction of travel. For this purpose, on both sides of the implement 3 there are provided respective hydraulic cylinders 10.

One end of each of the hydraulic cylinders, namely, the cylinder itself or the piston rod, is pivotally connected with the frame 1 at a fixed location. Each other end (piston rod or cylinder) engages the chopper housing 1'. The latter itself is pivotal about the axis M upon the frame 1 coinciding with the rotation axis of the chopper drum.

When the distance between the pivot point on the both ends of the hydraulic cylinders 10, supplied by the hydraulic control described in greater detail below, is increased, the implement 3 is raised. Conversely, a reduction results in a lowering of the implement.

The height adjustment of the implement can be effected by hand or by the automatic elevation device. The implement 3, which is suspended in a lower and an upper traverse of the chopper housing 1' is thus rotated together with the chopper housing 1' about the axis M to cause the lifting and lowering of the implement 3.

Whether the pick up attachment is a single-row or double-row attachment (FIG. 1) or a three- or more-row pick up attachment (FIG. 3) the elevating device is in every case, provided so that at least one of the front points is swingable about a pivot axis C transverse to the direction of travel on the elevatable intake unit. Preferably the front points are vertically displaceably articulated on one and the same pivot axis independently from one another so that the height-adjustment device comprises a plurality of height sensors disposed transversely across the operating width adjacent one another and formed by the pivotal front points 5, 6, 7.

An abutment surface 22 is additionally pivotable also about the same pivot axis C and comprises a metal plate which lies substantially vertically and transverse to the direction of travel. The abutment surface 22 can be swingable similarly to the front point, for example the front point 6 in the sense of the double-headed arrow about the pivot axis C.

The abutment surface 22 comprises an adjustment projection 22 extending rearwardly from its lower edge toward the intake unit 4 and in the form of a double plate which is juxtaposed with a perforated plate 12 on the intake unit 4. A pin 12' can thus adjust the abutment surface 22 in a selected one of a plurality of possible base positions. It is also self-understood to be possible that the abutment surface 22 can be provided with a stepless adjustment about the pivot axis C.

The above-described swingable arrangement of the front points or the swingable arrangement of an abutment surface 22 for each swingable front point about its pivot axis C will be developed further depending upon the nature of the height sensor used. In the fully enclosed interior of the front points 6, 7 serving as a separating point, a respective height sensor 13, 13' is provided in the form of a rod whose longitudinal dimension coincides with the direction of travel and which is movable in this longitudinal direction.

The rod can be a rectilinear cylindrical rod as shown in the Figures. Instead, however, it can have another cross section or, if desirable, an offset or plate-shaped configuration as long as it is enclosed in the front point and can cooperate with the abutment surface 22. It is to be observed that the height sensor 13, 13' itself in no way comes in contact with the ground or with the crop.

The height sensor 13 serves as the control element for two electric switches 14, 15 which are connected in the control circuit of the electromagnetic valve actuators of the distributing valves in the hydraulic lines to the hydraulic cylinders 10. One respective switch lies to each side of the height sensor laterally thereof and parallel to its longitudinal direction.

The switches 14, 15 thus lie with their switch plungers parallel to the direction of travel. The plunger of the switch 14 is turned rearwardly and the plunger of the switch 15, oppositely, into the travel direction. Two compression springs 16 and 17 are mounted upon the rod-shaped height sensor 13. The compression spring 16 bears against a pin 18 on its side turned toward the abutment surface 22 and provided on the height sensor 13.

Similarly, the pressure spring 17 is braced at its end turned toward the abutment surface 22 against an abutment 19 provided on the height sensor 13. The abutment 19 is likewise formed as a pin. It can, however, also have the configuration of a nut or the like which can be threaded along a screwthread formed on the cylindrical rod serving as the height sensor and locked by a counternut. The same also applies to the pin 18.

The compression spring 17 biases the height sensor 13 in the direction toward the abutment surface 22.

Figure 4:
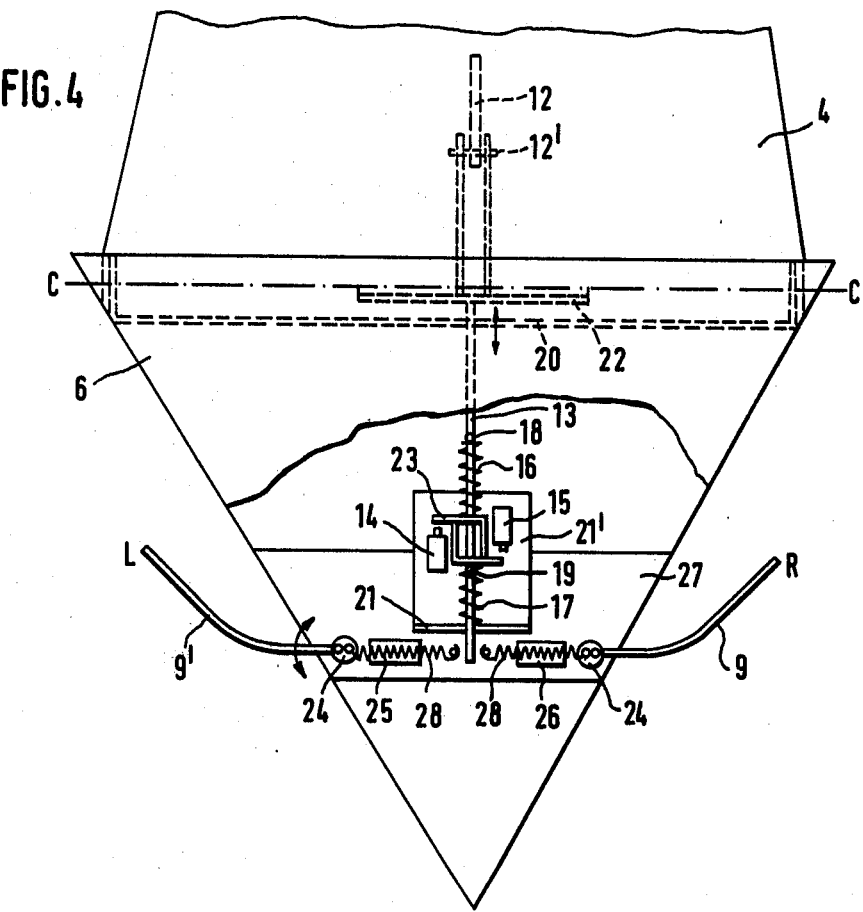
FIG. 4 is a front point with encapsulated arrangement of the mechanical lateral guide sensor and a height sensor.
Figure 5:
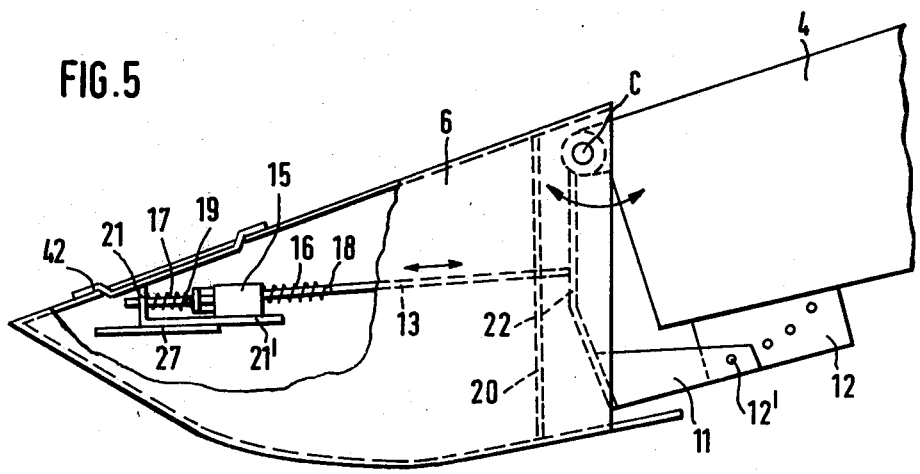
FIG. 5 is a partially broken away side elevation of a front point with only a height sensor.

The end of the height sensor 13 extends through an opening in a rear wall 20 which otherwise completely closes the front point 6. The height sensor 13 projects perpendicularly to this rear wall 20 and thus is not hindered in its mobility in the direction of the double arrow of FIGS. 4 and 5.

Height sensor 13 is pressed by the compression spring 17, which at its opposite end bears upon a transverse member 21 of a support plate 21', continuously against the abutment surface 22. The transverse member 21 is offset from the horizontally disposed support plate 21' upwardly and thus extends transverse to the direction of travel.

The support plate 21' also mounts the electric switches 14 and 15. This mounting is such that the switches 14 and 15, parallel to the direction of movement of the height sensor 13, are also adjustable parallel to the direction of movement of the respective switch plungers and can be fixed. To this end, they are held by clamping screws which are shiftable in elongated slots.

The switch actuator 23 has a frame-shaped configuration. This frame has two small sides traversed by the sensor 13 and extending transverse to the longitudinal dimension thereof, each provided with a lateral extension. The extension of one small side is disposed ahead of the switch 14, the extension of the other small side ahead of the switch 15. The extensions thus lie respectively ahead of the switch plungers of the switches 14 and 15.

Under the influence of the compression spring 16, the switch actuator 23 bears upon the abutment 19. The compression springs 16 and 17 have the effect of softening the impact on the switch plungers to thereby avoid damage. The holding of the height sensor 13 against the abutment surface 22 is effected by the compression spring 17 as well. The switch zero point is established by swinging the abutment surface 22 and correspondingly fixing it by the pin 12' on the perforated plate 12.

If the front point 6 tilts downwardly, the height sensor 13 penetrates to a greater extent into the front point. With this movement, it entrains the switch actuator 23 to bring it to bear upon the switch plunger of the electric switch 14. This operation effects the automatic command "lower" at the hydraulic cylinder 10.

When, conversely, the front point 6 is swung upwardly because it rides up upon an obstruction on the ground, the compression spring 17 presses the sensor 13 further out of the front point. This movement is transferred via the abutment 19 to the switch actuator 23 also, which thereby bears against the switch plunger of the switch 15. The switch 15 triggers automatically the control command "lift" at the hydraulic cylinder for raising the implement 3.

In the front point 6, which is closed by the vertical rear wall 20 and thereby completely encased, there is additionally provided a lateral guide arrangement in a compact configuration together with the elevating device with its height sensor 13. For this purpose at least one lateral guide sensor 9 is disposed in the front point 6 (See Ser. No. 135,080 filed Mar. 28, 1980).

Thus, in the embodiment of FIG. 1 with a two-row picker attachment, two such lateral guide sensors 9, 9' are provided (compare also FIG. 4), each sensing a respective one of the two successive rows 8 of cornstalks. In the embodiment of FIG. 3 with a three-row picker attachment, each of the separator points 6, 7 has a respective lateral guide sensor 9 or 9' which engages one and the same row 8 of cornstalks from opposite sides of the latter.

The lateral guide sensors 9, 9' have been shown only schematically in the drawing. Sensors 9, 9' are arcuate rods bent against the direction of travel and are fastened within the front point at their inner ends upon disks 24. The disks 24 are eccentrically journaled and actuated via circumferential cams or the like, the switch plungers of electric switches 25, 25 which are held opposite one another by a support plate 27 which also defines the pivot axes of the disks 24 and carries the support plate 21', the disks 24 being engaged by zero-setting springs 28. The function of such lateral guide sensors is the same as that described in the above-identified copending application.

Figure 6:
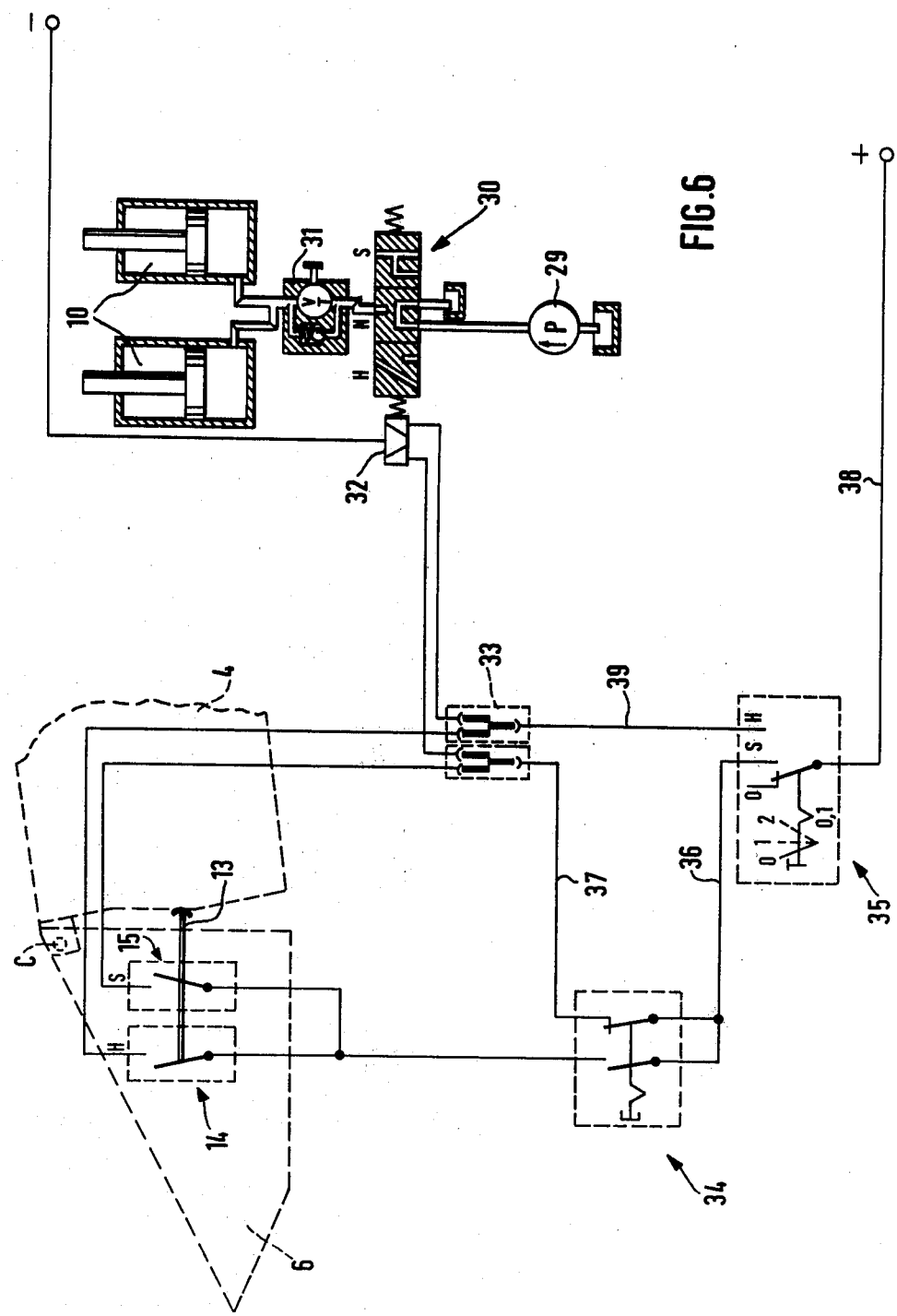
FIG. 6 is an electrical circuit diagram and hydraulic diagram for the embodiment according to FIG. 5.

FIG. 6 shows the control function of the height-adjusting device:

The hydraulic cylinders 10 are connected to a hydraulic pump 29 via a distributing valve 30 and a valve set 31 which comprises a parallel network of a check valve and a throttle. The oil supply stream is passed by the check valve unthrottled and the return stream, upon closing of the check valve, passes through the throttle. The distributing valve is a three-port/three-position distributing valve. In this Figure it is shown in its neutral position in which the filling state of a hydraulic cylinder is maintained and thus the elevation of the implement 3 is fixed. An electromagnetic valve actuator 32 is connected to the distributing valve 30 and has two feed lines, each, depending upon the one to which potential is applied, switches the distributing valve into the settings "lift" and "lower" respectively. The connection of the valve actuator 32 with the current source is effected via a distributor or connector set 33 which allows the operation by the height-sensor 13 actuated switches 14, 15 through an automatic switch 34, or by the manual switch 35.

In their rest positions, both of the switches 14 and 15 are open, they define, by the positions of the switches 14, 15 on the support plate 21', a preestablished switch play referring to a height in which the switches are not actuated. The automatic switch 34 is provided with an interrupter switch between the current supply to the switches 14, 15 and a connecting line 36 to the "lower" contact of the manual switch 35.

The automatic switch has an additional second interrupter switch which, contrary to the first, is closed in the rest position of the automatic switch but is opened upon pressing of the automatic switch. This interrupter is connected between the connecting line 36 to the "lower" contact of the manual switch 35 on the one hand and a connecting line 37 of the automatic switch 34 with the "lower" contact of the distributor 33.

The manual switch, on its part, has an effectiveless switch position "0" which is indexed, as well as a further indexed switch setting "1" in which its "lower" contact is connected with the feedline 38, as well as a nonretained switch setting "2" in which its "lifting" contact is connected via the feedline 38 to the current source. The "lift" contact of the manual switch 35 is connected via a connecting line 39 directly with the lifting contact of the distributor 33.

The height-adjustment device operates as follows:

If the automatic switch 34 is not actuated, the implement can be correspondingly controlled by the manual switch 35 by switching it between the working positions "1" and "2" by hand. For the automatic height control it is sufficient to lock the manual switch 35 in its indexed switch position "1" and to press the automatic switch 34. The lowering process or any necessary lifting is then controlled by the switches 14 and 15 and, indeed, depending upon the actuation of the latter by the height sensor 13.

If switch 15 is closed, the feedline 38 is connected with the lower contact of the distributor 33 and the valve switcher 32 is then so controlled that the implement 3 is lowered by the hydraulic cylinders 10. Conversely, when the switch 14 is closed by the height sensor, the feedline 38 is connected with the lifting contact of the distributor 33 and the valve switcher 32 is so controlled that the hydraulic cylinders 10 lift the implement 3.

Apart from the operation there is always the possibility of overriding the control by hand with the aid of the manual switch 35:

Should the implement be elevated, it suffices to switch over the manual switch 35 into its nonretained switch position "2". The automatic height control device is thus currentless and the valve switcher 32 is directly controlled to raise the implement 3.

Figure 7:
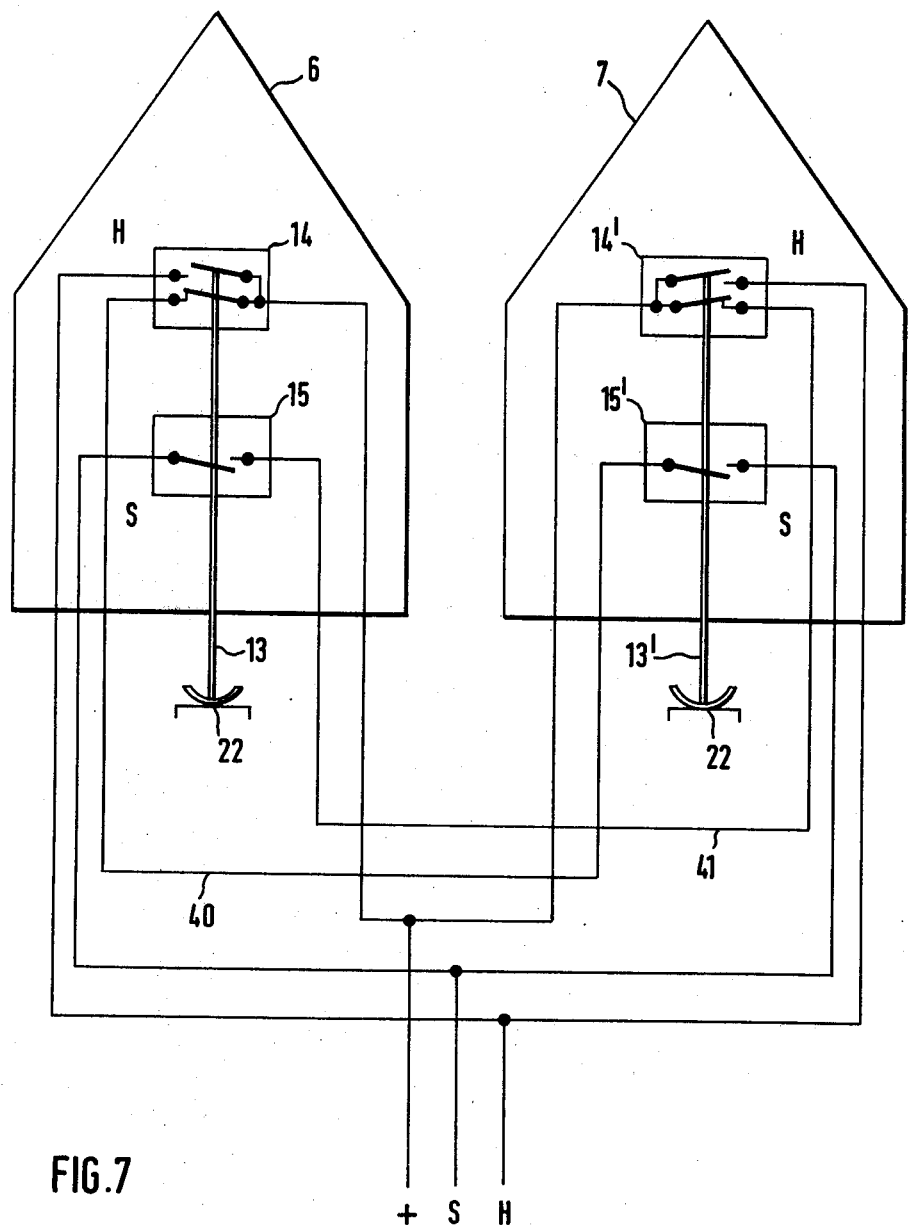
FIG. 7 is a refinement of FIG. 6 with height sensors in two front points disposed adjacent one another transverse to the direction of travel on the intake unit and pivotal and independently movable relative to one another.

When the harvesting machine has two front points 6, 7 next to one another which can be height adjustable independently from one another on the intake unit 4, the control system of FIG. 7 operates in the indicated manner:

As has been indicated in connection with the embodiment described in FIG. 6, the front points 6,7 are each provided with a switch 14, 14' for the "lift" command and a switch 15, 15' for the "lower" command. The switches are each actuated by a height sensor 13, 13' which is held by spring pressure against the abutment surface 22. The position of the two height sensors 13, 13' is thus independent from one another because the two front points 6, 7 are independently swingable about the pivot axis C. In all cases, the control command "lift" has priority over the control command "lower". It is possible that one of the front points can drop into a trench in the ground and further movement can bring the other control point into contact with an obstacle so that an already existing "lower" command will only increase the resulting difficulties.

However, the switches 14, 14' for the control command "lift" can be provided each as a double switch in the indicated manner with the current supply for the rest contacts of the switches 15, 15' for the control command "lower" being taken via the additional contact pair of the switches 14, 14'. In the indicator rest position, the connection of the supply line (plus) with the feedline for the control command to the valve switcher (compare FIG. 6) is interrupted and all working contact pairs of the switches are open. In this rest position, the lower additional contact pair of switches 14, 14' are closed so that the rest contacts of the switches 15, 15' are connected via auxiliary lines 40, 41 with the feedline. The additional contacts of the switches 14, 14' remain connected and thus the rest contacts of the switches 15, 15' connected with the feedline when, via the height sensors 13, 13', the switch 15, 15' is closed. The dropping of one of the front points 6, 7 downwardly and thus the pressing of the associated height sensor 13, 13' into the front point is corrected so that the control signal "lower" is applied at the valve switcher 32 of the distributor valve 30.

If for example the switch 15 of the above-described manner is closed and the feedline (÷) is connected with the line for the control command "lower" of the valve switcher 32 via the additional contact pair of the switch 14', the auxiliary line 41 and the closed switch 15, and in this situation the front point 7 encounters a barrier, the following occurs:

The front point 7 is lifted and the height sensor 13 extends out of the front point and closes the working contact pair of switch 14'. The feedline (÷) is thereby directly connected with the supply line for the control command "lift" of the valve switcher. Simultaneously, however, the connection between the additional contact pair and switch 14' is opened and thus the connection between the rest contactor switch 15 in the other contact point with the supply line is interrupted. In spite of the fact that switch 15 is closed, no connection is possible between the supply line (÷) with the feedline for the control command "lower" to the valve switcher 32. Thus the configuration of the switches 14, 14' as double switchers and the connection of the switches 15, 15' with the supply line via the additional contact pair of these double switches through the auxiliary lines 40, 41 in the above-described manner ensures that in all cases the control command "lift" will have priority over the control command "lower" as is required for practical field operations. It will be self-understood also that the embodiment of FIG. 7 can be overridden by hand in the manner described in connection with FIG. 6. With a manual override with the aid of the manual switch 35, the automatic switch 34 need not by additionally actuated. The manual control is thus especially simple.

Within the front point 6, the switching device is accessible through an opening in the front surface above the switches 14, 15. This facilitates the setting of the switch plate and the maintenance of the height adjustment device. To maintain the advantages of the encapsulated construction, the opening is closed by a threaded cover 42.

We claim:
1. An agricultural crop harvesting machine comprising:
    a machine frame formed with a crop processor and displaceable in a crop-harvesting direction of advance;
    a crop pickup unit swingably mounted on said frame about a first axis generally transverse to said direction of advance whereby a leading end of said unit can be raised and lowered by swinging said unit about said first axis;
    at least one hydraulic cylinder arrangement pivotally connected to said frame and to said unit at locations offset from said first axis;
    at least one hollow point mounted at said end of said unit for pivotal movement about a second axis transverse to said direction of advance and riding on the ground whereby the pivotal movement of said point follows the ground contour; and
    switch means responsive to the displacement of said point about said axis for controlling said hydraulic arrangement to raise and lower said unit to adjust the height thereof relative to the ground during crop harvesting, said switch means being disposed within said point, said point being provided with an elongated height sensor disposed in said point and actuating said switch means upon angular displacement of said point about said second axis, said sensor extending longitudinally in said point and passes through an opening formed in a rear wall thereof toward said unit, said unit being formed with at least one adjustable abutment surface engageable with said sensor for establishing a height reference therefor, said switch means includes a pair of switches disposed in said point and respectively assigned to issue "lift" and "lower" commands for said arrangement, said sensor being provided with a switch actuator movably mounted on the sensor and engageable with said switches selectively and spring means for resisting relative movement of said sensor and said actuator, said sensor is a rod and said spring means includes a first spring biasing said actuator against an abutment on said rod and seated against said rod at a location spaced from said abutment, and a further spring biasing said abutment in the direction opposite the effective direction of the first spring.

2. The harvesting machine defined in claim 1 wherein said abutment surface comprises a plate swingable about said second axis and provided with a formation adapted to lock said plate in one of a plurality of selective angular positions about said second axis.

3. The harvesting machine defined in claim 2 wherein said point is provided with an opening affording access to said switch means and a removable cover sealing said outlet.

4. The harvesting machine defined in claim 2, further comprising at least one lateral guide sensor received in said point and enclosed with said height sensor and switch means therein for aligning the machine with a row of crop material.

5. The harvesting machine defined in claim 2, wherein said switches are disposed on opposite sides of said rod and have plungers turned in opposite directions, said actuator comprising a rectangular frame having small sides traversed by said rod and provided at diagonally opposite corners with lateral projections respectively engageable with plungers of said switches.

6. The harvesting machine defined in claim 2 wherein said switches are connected in an electrical circuit with a valve actuator having a distributing valve connected to said hydraulic arrangement, said circuit including a manual override switch for disabling said switch means and independently initiating "lift" and "lower" commands for said valve actuator.

7. The harvesting machine defined in claim 2 wherein said pickup unit is provided with two points pivotable about said second axis and each provided with a respective one of said sensors and switch means, both of said switch means being connected in a common circuit to control said hydraulic arrangement whereby a "lift" command from either switch means has priority over a "lower" command.

8. In an agricultural crop harvesting machine comprising:
- a machine frame formed with a crop processor and displaceable in a crop-harvesting direction of advance;
- a crop pickup unit swingably mounted on said frame about a first axis generally transverse to said direction of advance whereby a leading end of said unit can be raised and lowered by swinging said unit about said first axis;
- at least one hydraulic cylinder arrangement pivotally connected to said frame and to said unit at locations offset from said first axis;
- at least one hollow point mounted at said end of said unit for pivotal movement about a second axis transverse to said direction of advance and rinding on the ground whereby the pivotal movement of said point follows the ground contour; and
- switch means responsive to the displacement of said point about said axis for controlling said hydraulic arrangement to raise and lower said unit to adjust the height thereof relative to the ground during crop harvesting, the improvement wherein
- said switch means is disposed wholly within and is protected by said point,
- said point being provided with an elongated height sensor disposed in said point and actuating said switch means upon angular displacement of said point about said second axis,
- said sensor extends longitudinally in said point and passes through an opening formed in a rear wall thereof toward said unit, and
- said unit being formed with at least one adjustable abutment surface engageable with said sensor for establishing a height reference therefor.

9. The improvement defined in claim 8 wherein said switch means includes a pair of switches respectively assigned to issue "lift" and "lower" commands for said arrangement, said sensor being provided with a movable switch actuator selectively engageable with said switches and spring means for resisting relative movement of said sensor and said actuator.

* * * * *